United States Patent [19]

Rudolf et al.

[11] Patent Number: 4,457,982
[45] Date of Patent: Jul. 3, 1984

[54] ACICULAR FERRIMAGNETIC IRON OXIDE AND ITS PREPARATION

[75] Inventors: Peter Rudolf, Neuhofen; Jenoe Kovacs, Hessheim; Guenter Vaeth, Limburgerhof, and Manfred Ohlinger, Frankenthal, all of Fed. Rep. of Germany

[73] Assignee: BASF Aktiengesellschaft, Fed. Rep. of Germany

[21] Appl. No.: 461,746

[22] Filed: Jan. 28, 1983

[30] Foreign Application Priority Data

Feb. 10, 1982 [DE] Fed. Rep. of Germany ....... 3204547

[51] Int. Cl.$^3$ .............................................. C01G 49/06
[52] U.S. Cl. ................................ 428/403; 252/62.56; 252/62.59; 427/127; 428/693; 428/694; 428/900
[58] Field of Search .......................... 252/62.59, 62.56; 427/127; 428/403, 900, 693, 694

[56] References Cited

U.S. PATENT DOCUMENTS

| | | | |
|---|---|---|---|
| 2,900,236 | 8/1959 | Speed et al. | 23/200 |
| 3,082,067 | 3/1963 | Hund . | |
| 3,498,748 | 3/1970 | Gremer | 252/62.56 X |
| 3,903,004 | 9/1975 | Matsumoto et al. | 252/62.59 X |
| 3,912,646 | 10/1975 | Leitner et al. | 252/62.59 X |
| 4,056,410 | 11/1977 | Corradi et al. | 252/62.56 X |
| 4,059,716 | 11/1977 | Kopke et al. | 428/403 |
| 4,311,684 | 1/1982 | Umeki | 252/62.59 X |
| 4,388,360 | 6/1983 | Miyoshi et al. | 428/900 |

FOREIGN PATENT DOCUMENTS 2026998 2/1980 United Kingdom ............. 252/62.59

Primary Examiner—Jack Cooper
Attorney, Agent, or Firm—Keil & Weinkauf

[57] ABSTRACT

A modified acicular ferrimagnetic iron oxide which consists of a core of gamma-iron(III) oxide and a surrounding shell of gamma-iron(III) oxide modified by tin dioxide and carbon, and a process for its preparation.

3 Claims, No Drawings

ACICULAR FERRIMAGNETIC IRON OXIDE AND ITS PREPARATION

The present invention relates to a modified acicular ferrimagnetic iron oxide and a process for its preparation.

Acicular ferrimagnetic iron oxides have long been used extensively in the production of magnetic recording media. Many processes for the preparation of gamma-iron(III) oxide are known. Inter alia, a process wherein synthetic lepidocrocite is reduced in the presence of decomposable organic compounds to give magnetite and the latter subsequently oxidized to give gamma-iron(III) oxide has been described (U.S. Pat. No. 2,900,236 and German Laid-Open Applications DOS No. 2,805,405 and DOS No. 2,805,621). The application of organic, in most cases long-chain, substances to the lepidocrocite or its dehydration product is intended to restrict sintering of the particles during the conversion process and thus produce an anisotropic material which is dimensionally stable and hence readily orientable magnetically.

A disadvantage of these processes, however, is that the products obtained have coercive forces of no more than about 26 kA/m. To achieve higher values, additional measures are required, for example dehydration of the lepidocrocite before application of the organic material for the reduction (German Laid-Open Application DOS No. 2,805,405), introducing the organic reducing agent in vapor form (German Laid-Open Application DOS No. 2,904,085) or carrying out the reduction with the aid of a mixture of hydrogen and the organic material. Although the coercive forces of the magnetic iron oxides can be substantially increased in this manner, the resulting greater mean X-ray crystallite size and broader particle size spectrum have, when the materials are used to produce magnetic recording media, a particularly adverse effect on the noise level and the maximum output level at short wavelengths.

It is an object of the present invention to provide an acicular ferrimagnetic iron oxide which has a high coercive force and can be employed to produce a low-noise magnetic recording medium.

We have found that this object is achieved, and that an acicular ferrimagnetic iron oxide having the requisite properties is obtained, if this iron oxide consists of a core of gamma-iron(III) oxide and a surrounding shell of gamma-iron(III) oxide modified by tin dioxide and carbon. These iron oxides are particularly advantageous if they contain from 0.15 to 1.5% by weight of tin dioxide and from 0.1 to 1% by weight of carbon, the percentages being based on the total amount of material.

To prepare the novel iron oxides, synthetic lepidocrocite, or an alpha-iron(III) oxide obtained therefrom by dehydration, is provided with a deposit of tin dioxide and with an organic compound which is decomposable in the presence of iron oxide, and the material treated in this manner is reduced, at from 350° to 500° C., to magnetite, which is then oxidized by means of oxygen-containing gases at from 200° to 450° C. to give gamma-iron(III) oxide.

The lepidocrocite employed for this process can be prepared, under suitable reaction conditions, from an iron(II) salt solution and an alkali with simultaneous oxidation, for example as described in German Published Application DAS No. 1,061,760. It has proved particularly advantageous to produce iron(II) oxide hydrate seeds from an aqueous iron(II) chloride solution using an alkali, eg. an alkali metal hydroxide or ammonia, at from 10° to 36° C. while stirring vigorously to produce fine air bubbles, no more than from 25 to 60 mole percent of the iron employed being converted into the said seeds. These seeds, at from 20° to 70° C., at a pH of from 4.0 to 5.8 set up by the addition of further amounts of alkali, and with vigorous distribution of air, then grow to give the end product. After growth, is complete, the aqueous suspension should contain from 10 to 70 g/liter, preferably from 15 to 65 g/liter, of solid iron(III) oxide hydroxide. The precipitate is filtered off and washed, and the iron(III) oxide hydroxide thus obtained is dried at from 60° to 200° C. In this manner, stable acicular crystals of lepidocrocite exhibiting virtually no dentritic branching can be obtained. They have a mean particle length of from 0.2 to 1.5 $\mu$m, a length/width ratio of not less than 10:1, usually from 12 to 40:1, and a BET surface area of from 20 to 70 m$^2$/g. Before being processed further, a lepidocrocite having these characteristics can be dehydrated at from 300° to 700° C., either in air or in an inert gas atmosphere, to give alpha-iron(III) oxide. A lepidocrocite containing no more than 20% by weight of alpha-iron(III) oxide hydroxide (goethite) is equally suitable.

To prepare the novel iron oxide, a lepidocrocite prepared in the above manner, or an alpha-iron(III) oxide obtained therefrom by dehydration, is suspended in water, and the tin(II) compound, either in the form of an aqueous acidic solution of a tin(II) salt or as an emulsion of an organo-tin compound, is added to this suspension. Where the aqueous tin(II) salt solution is used, the precipitation and hence the deposition of the tin dioxide onto the iron oxide material present in the suspension are effected by adding a basic substance and simultaneously passing in air. Where an organo-tin compound is used, it is adsorbed directly onto the surface of the iron oxide.

The organic compounds required for the preparation of the novel iron oxide are likewise adsorbed onto the surface of the lepidocrocite present in the suspension, or of the lepidocrocite dehydration product present therein. The appropriate organic compounds must be decomposable in the presence of an iron oxide at the temperatures prescribed for the process, ie. at from 350° to 500° C. A number of different compounds have been employed for this purpose. For the preparation of the novel iron oxides, any organic compound has been found to be advantageous which is liquid at room temperature, decomposable and sparingly volatile at the stated temperatures and readily adsorbed onto the surface of the lepidocrocite or its dehydration product. Unsaturated fatty acids, fatty acid esters and olive oil are particularly suitable for the preparation of the novel iron oxides. The use of an organo-tin compound enables the modification of the iron oxide by tin and the adsorption of the organic compound to be combined, a further, separate addition thus being unnecessary.

The treatment of the lepidocrocite or its dehydration product may be carried out either in the above sequence or in a different sequence; for example, the organo-tin compound in water is placed in the reactor first and then the iron oxide material is introduced. The amount added is from 0.1 to 2, preferably from 0.05 to 0.6, % by weight of tin, and from 1.5 to 4, preferably from 2 to 3, % by weight of the organic compound, the percentages being based in each case on the lepidocrocite or its dehydration product.

The lepidocrocite, or its dehydration product, which has been treated in this manner is then reduced to magnetite at from 350° to 500° C. To do this, the material is heated for from 15 to 120 minutes either in a stream of an inert gas alone, usually nitrogen, or in a nitrogen/hydrogen stream.

The acicular magnetite which is obtained after this reduction reaction and has been modified by tin and carbon is then oxidized by passing oxygen-containing gases over it at from 200° to 450° C., the correspondingly modified gamma-iron(III) oxide being obtained.

This gamma-iron(III) oxide according to the invention thus comprises a core of gamma-iron(III) oxide and a surrounding shell of gamma-iron(III) oxide modified by tin dioxide and carbon. This outer layer is formed as the result of the superficial application of a tin compound and an organic compound under the stated reduction and oxidation conditions.

A gamma-iron(III) oxide modified in this manner has, in particular, a high coercive force, and also exhibits a small X-ray crystalline size and a narrow particle size distribution, which are advantageous if the material is to be used as magnetic pigment in the production of magnetic recording media. As a result of the latter two properties, the field strength distribution of these novel materials is very narrow, giving low-noise recording media which, because of the high coercive force, have a good maximum output level at short wavelengths.

To produce the magnetic recording medium, the novel gamma-iron(III) oxide is dispersed in a polymeric binder. Suitable binders are those compounds which are conventionally used for this purpose, for example nylons, polyurethanes, mixtures of polyisocyanates with high molecular weight polyhydroxy compounds, copolymers of vinyl chloride with comonomers such as vinyl esters of monocarboxylic acids, esters of aliphatic alcohols and unsaturated carboxylic acids, eg. acrylic acid, methacrylic acid or maleic acid, these carboxylic acids themselves, hydroxyl-containing vinyl chloride copolymers and acetates, these compounds being used either alone or as mixtures with one another. The magnetic layer may furthermore be crosslinked. To disperse the magnetic materials in the binder solution, it is advantageous to add a conventional dispersant, eg. a salt of a fatty acid, soybean lecithin or another suitable substance, in an amount of from 0.5 to 6 percent by weight, based on the weight of the magnetic material. Furthermore, additives, such as esters, carboxylic acids or silicone oils, in amounts of from 0.5 to 10% by weight, are conventionally used for reducing the coefficient of friction of the magnetic layer. As further additives, it is also possible to add fillers, eg. conductive carbon, graphite and/or non-magnetizable silicate-based powders, to the dispersion in a conventional manner. After the dispersion has been prepared, it is applied to a conventional polyethylene terephthalate film using a conventional coating apparatus, and a magnetic field is employed to effect orientation of the particles in a preferred direction. After application and drying of the magnetic layer, this layer is advantageously surface-treated or calendered, and the coated film is slit to the desired tape width on a machine conventionally used for producing magnetic recording media.

The Examples which follow illustrate the invention, and the Comparative Experiments compare it to the prior art.

The magnetic properties of the pigments were measured by means of a conventional vibrating sample magnetometer, at 160 kA/m field strength, each oxide sample having a tamped density of $D=1.2$ g/cm$^3$. The coercive force ($H_c$) is quoted in [kA/m], and the specific remanence ($M_r/\rho$) and the specific saturation magnetization ($M_m/\rho$) in [nT.m$^3$/g]. The specific surface area ($S_{N_2}$) of the powder was determined by the BET meghod (N$_2$ adsorption), and is given in m$^2$/g. The magnetic tape samples were investigated at a field strength of 160 kA/m, likewise using a vibrating sample magnetometer. The coercive force $H_c$, the remanence $M_r$ in [mT] and the orientation ratio OR, ie. the ratio of residual induction in the preferred direction of particle orientation to that at right angles to this direction, are given. The electro-acoustic properties of the tape samples were measured in accordance with DIN 45,512, Part II, against reference tape T 308 S, the noise level of which was taken to be 0db.

EXAMPLE 1

200 g of an acicular $\gamma$-FeOOH having a BET specific surface area of 32 m$^2$/g, a mean particle length of 0.5 $\mu$m and a length/width ratio of 16:1 were suspended in 1600 g of water using a high-speed stirrer. A solution containing 8 g of SnCl$_2$ and rendered weakly acidic with hydrochloric acid was added to the suspension, and the mixture was stirred for 10 minutes. While air was being passed through the suspension, the pH of the latter was brought to 8.0 by means of dilute sodium hydroxide solution, and stirring was continued for a further 10 minutes, after which 5 g of olive oil were metered in without further passage of air. Finally, stirring was continued for a further 10 minutes, after which the suspension was filtered, and the solids washed thoroughly, and dried at 150° C. The dry product contained an amount of tin dioxide corresponding to 0.25% by weight of tin, and an amount of olive oil corresponding to 3.8% by weight of carbon.

EXAMPLE 2

The procedure described in Example 1 was followed, except that the SnCl$_2$ solution containing hydrochloric acid was added in an amount such that the end product had an SnO$_2$ content corresponding to 0.4% by weight of tin.

EXAMPLE 3

The procedure described in Example 1 was followed, except that the SnCl$_2$ solution containing hydrochloric acid was added in an amount such that the end product had an SnO$_2$ content corresponding to 0.6% by weight of tin.

EXAMPLES 4A, B AND C 200 g portions of lepidocrocite with the properties stated in Example 1 were dehydrated in air for one hour at 480° C. 180 g, in each case, of the resulting alpha-iron(III) oxide were modified, as described in Examples 1, 2 and 3, with 5 g of olive oil, corresponding to 3.8% by weight of carbon, and SnO$_2$, corresponding to 0.25% by weight (Example 4A), 0.4% by weight (Example 4B) and 0.6% by weight (Example 4C) of tin.

EXAMPLES 5A, B AND C

The procedure described in Examples 4A, B and C was followed, except that the lepidocrocite employed was dehydrated in air for one hour at 550° C. 180 g, in each case, of the resulting alpha-iron(III) oxide were modified, as described in Examples 1, 2 and 3, with 5 g of olive oil, corresponding to 3.8% by weight of carbon, and SnO$_2$, corresponding to 0.25% by weight (Example 5A), 0.4% by weight (Example 5B) and 0.6% by weight (Example 5C) of tin.

EXAMPLE 6

In a rotating flask, a lepidocrocite treated as described in Example 1 was reduced in a stream of nitrogen at 520° C. in the course of 30 minutes to give magnetite, which was then oxidized in a nitrogen/air mixture at 300° C. to give gamma-iron(III) oxide. The results of the measurements are given in Table 1.

EXAMPLE 7

In a rotating flask, a lepidocrocite treated as described in Example 1 was reduced in a 1:2 nitrogen/hydrogen stream at 440° C. in the course of 60 minutes to give magnetite, which was then oxidized as described in Example 6 to give gamma-iron(III) oxide. The results of the measurements are given in Table 1.

EXAMPLE 8

A lepidocrocite treated as described in Example 2 was reduced, as described in Example 7, at 460° C., and the product obtained was then oxidized to gamma-iron(III) oxide. The results are given in Table 1.

EXAMPLE 9

A lepidocrocite treated as described in Example 3 was reduced, as described in Example 7, at 480° C., and the product obtained was then oxidized to gamma-iron(III) oxide. The results are given in Table 1.

EXAMPLE 10

An alpha-iron(III) oxide treated as described in Example 4A was reduced, as described in Example 7, at 450° C., and the product obtained was then oxidized at 280° C. to gamma-iron(III) oxide. The results are given in Table 1.

EXAMPLE 11

An alpha-iron(III) oxide treated as described in Example 4A was converted as described in Example 7, at 440° C., into gamma-iron(III) oxide. The results are given in Table 1.

EXAMPLE 12

An alpha-iron(III) oxide treated as described in Example 4B was converted as described in Example 8 into gamma-iron(III) oxide. The results are given in Table 1.

EXAMPLE 13

In a rotating flask, an alpha-iron(III) oxide treated as described in Example 5A was reduced in a nitrogen stream at 500° C. in the course of 30 minutes to give magnetite, which was then oxidized in a nitrogen/air stream at 280° C. to give gamma-iron(III) oxide. The results are given in Table 1.

EXAMPLE 14

In a rotating flask, an alpha-iron(III) oxide treated as described in Example 5A was reduced at 450° C. in a nitrogen/hydrogen stream to give magnetite, which was then oxidized in a nitrogen/air stream at 330° C. to give gamma-iron(III) oxide. The results of the measurements are given in Table 1.

EXAMPLE 15

An alpha-iron(III) oxide treated as described in Example 5B was converted as described in Example 14 into gamma-iron(III) oxide. The results of the measurements are given in Table 1.

COMPARATIVE EXPERIMENT 1

Acicular $\gamma$-FeOOH as described in Example 1 was treated as stated in that Example, except that olive oil was not added. The resulting material was then converted into gamma-iron(III) oxide, under the conditions stated in Example 7. The results of the measurements are given in Table 1.

COMPARATIVE EXPERIMENT 2

Acicular $\gamma$-FeOOH was treated as described in Example 2, except that olive oil was not added, and was converted into gamma-iron(III) oxide, under the conditions described in Example 8. The results of the measurements are given in Table 1.

COMPARATIVE EXPERIMENT 3

Acicular $\gamma$-FeOOH was treated as described in Example 3, except that olive oil was not added, and was converted into gamma-iron(III) oxide, under the conditions described in Example 9. The results of the measurements are given in Table 1.

COMPARATIVE EXPERIMENT 4

The procedure described in Comparative Experiment 1 was followed, except that, instead of the SnCl$_2$ solution, olive oil was employed. The results of the measurements are given in Table 1.

TABLE 1

| | $H_c$ | $M_{r/\rho}$ | $M_{m/\rho}$ | $SN_2$ |
|---|---|---|---|---|
| Example 6 | 25.1 | 35 | 80 | 20.8 |
| Example 7 | 28.4 | 38 | 76 | 21.7 |
| Example 8 | 28.4 | 37 | 75 | 21.8 |
| Example 9 | 28.8 | 39 | 75 | 19.1 |
| Example 10 | 30.8 | 42 | 82 | 18.3 |
| Example 11 | 30.0 | 42 | 77 | 19.8 |
| Example 12 | 30.5 | 42 | 75 | 19.7 |
| Example 13 | 29.0 | 42 | 82 | 18.1 |
| Example 14 | 30.2 | 43 | 82 | 20.8 |
| Example 15 | 30.5 | 41 | 73 | 20.8 |
| Comparative Experiment 1 | 25.8 | 44 | 82 | 14.4 |
| Comparative Experiment 2 | 26.2 | 42 | 81 | 15.0 |
| Comparative Experiment 3 | 26.2 | 41 | 78 | 15.1 |
| Comparative Experiment 4 | 25.7 | 40 | 80 | 22.6 |

2% and 3%, respectively, of dibutyl-tin dilaurate, ie. 2 and 3 g, respectively, based on 100 g of iron oxide, were emulsified in 1,600 ml of water for 5 minutes. Thereafter, respectively, 200 g of lepidocrocite, 180 g of a lepidocrocite dehydrated at 480° C. for 1 hour and 180 g of a lepidocrocite dehydrated at 550° C. for 1 hour were added, and dispersion was effected for a further 20 minutes. The suspension was filtered and the residue was dried at 130° C.

Analysis showed that the treated material contained 1% of organic carbon where 2% of dibutyl-tin dilaurate was used, and 1.4% of organic carbon where 3% of dibutyl-tin dilaurate was used.

EXAMPLE 17

200 g of a $\gamma$-FeOOH treated as described in Experiment 16 with 2% of dibutyl-tin dilaurate were reduced at 460° C. for one hour in an N$_2$/H$_2$ stream to give magnetite, which was then reoxidized at 330° C. in an N₂/air stream to give γ-Fe₂O₃. The results of the experiment are given in Table 2.

EXAMPLE 18

200 g of a lepidocrocite treated as described in Experiment 16 with 3% of dibutyl-tin dilaurate were reduced at 500° C. for 30 minutes in an N₂ stream to give magnetite, which was then reoxidized at 300° C. in an N₂/air stream to give γ-Fe₂O₃. The results of the experiment are given in Table 2.

EXAMPLE 19

200 g of a γ-FeOOH treated as described in Experiment 16 with 3% of dibutyl-tin dilaurate were reduced in an N₂/H₂ stream for one hour to give magnetite, which was then reoxidized in an air/N₂ stream to give γ-Fe₂O₃. The results of the experiment are given in Table 2.

EXAMPLE 20

180 g of γ-FeOOH dehydrated at 480° C. for 1 hour and treated with 2% of dibutyl-tin dilaurate, as described in Experiment 16, were reduced at 440° C. for one hour in an N₂/H₂ stream to give magnetite, which was then reoxidized in an air/N₂ stream at 330° C. to give γ-Fe₂O₃. The results of the experiment are given in Table 2.

EXAMPLE 21

180 g of a γ-FeOOH dehydrated at 480° C. for 1 hour and treated with 3% of dibutyl-tin dilaurate, as described in Experiment 16, were reduced at 440° C. for one hour in an N₂/H₂ stream to give magnetite, which was then reoxidized in an air/N₂ stream at 330° C. to give γ-Fe₂O₃. The results of the experiment are given in Table 2.

EXAMPLE 22

180 g of a lepidocrocite dehydrated at 550° C. for 1 hour and treated with 3% of dibutyl-tin dilaurate, as described in Experiment 16, were reduced at 440° C. for one hour in an N₂/H₂ stream to give magnetite, which was then reoxidized in an air/N₂ mixture at 280° C. to give γ-Fe₂O₃. The results of the experiment are given in Table 2.

TABLE 2

| | $H_c$ | $M_{r/p}$ | $M_{m/p}$ | $SN_2$ |
|---|---|---|---|---|
| Example 17 | 26.8 | 40 | 76 | 16.3 |
| Example 18 | 24.9 | 33 | 79 | 18.1 |
| Example 19 | 27.7 | 39 | 75 | 18.4 |
| Example 20 | 31.5 | 43 | 76 | 18.8 |
| Example 21 | 31.0 | 42 | 75 | 18.7 |
| Example 22 | 31.0 | 43 | 82 | 19.9 |

EXAMPLE 23

A magnetic pigment dispersion was prepared with the gamma-iron(III) oxide material obtained as described in Example 10, and this dispersion was used to produce a magnetic tape. To prepare the magnetic dispersion, a tube mill was charged with 8,000 parts of steel balls of 5 mm diameter, and thereafter 700 parts of the magnetic material, 420 parts of a mixture of equal parts of tetrahydrofuran and dioxane, 8.75 parts of lecithin, 8.75 parts of a neutral polyaminoamide salt and 210 parts of a 20% strength solution of a copolymer of 80% of vinyl chloride, 10% of dimethyl maleate and 10% of diethyl maleate in a mixture of equal parts of tetrahydrofuran and dioxane were added. Preliminary dispersion of the mixture was carried out for 40 hours. Thereafter, 1,090 parts of a 10% strength solution of a thermoplastic polyurethane, obtained from adipic acid, butane-1,4-diol and 4,4'-diisocyanatodiphenylmethane, in a mixture of equal parts of tetrahydrofuran and dioxane, and 0.7 part of polydimethylsiloxane were added, and dispersing was continued for a further 5 hours. The magnetic dispersion obtained was passed under pressure through a filter of 5 μm pore size. A 6 μm thick polyethylene terephthalate film was coated with the magnetic dispersion using a conventional knife coater, and the coated film was passed through a magnetic field and then dried at from 60° to 100° C. The thickness d of the dry magnetic layer was 4.4 μm. The coated film was passed between heated rollers (80° C., nip pressure 3 kg/cm) to compact the magnetic layer, and was then slit into 3.81 mm wide tapes. The electro-acoustic properties were measured in accordance with DIN 45,512, Sheet 2, with reference to reference tape T 308 S. The results of the measurements are given in Table 3.

EXAMPLE 24

The procedure described in Example 23 was followed, except that a gamma-iron(III) oxide prepared as described in Example 14 was employed. The results of the measurements are given in Table 3.

TABLE 3

| | Magnetic properties | | | | Electro-acoustic properties | | |
|---|---|---|---|---|---|---|---|
| | $H_c$ | $M_r$ | OR | d(μm) | $E_H$ | $A_H$ | S/N ratio |
| Example 23 | 29.2 | 137 | 2.2 | 4.4 | ±0 | +1.9 | +0.5 |
| Example 24 | 28.9 | 147 | 2.5 | 3.8 | ±0 | +1.4 | +0.2 |

$E_H$ = sensitivity at short wavelengths
$A_H$ = maximum output level at short wavelengths

We claim:
1. A modified acicular ferrimagnetic iron oxide which consists of a core of gamma-iron(III) oxide and a surrounding shell of gamma-iron(III) oxide modified by tin dioxide and carbon, and wherein the amount of tin dioxide is from 0.15 to 1.5% by weight and the amount of carbon is from 0.1 to 1% by weight, the percentages in each case being based on the total amount of the modified ferrimagnetic iron oxide.

2. A process for the preparation of a modified acicular ferrimagnetic iron oxide as claimed in claim 1, comprising depositing tin dioxide and an organic compound on a synthetic lepidocrocite, or an alpha-iron (III) oxide obtained therefrom by dehydration, said organic compound being liquid at room temperature and decomposable in the presence of iron oxide at from 350° to 500° C., reducing the synthetic lepidocrocite, or alpha-iron (III) oxide obtained therefrom by dehydration containing deposited tin dioxide and said organic compound, at from 350° to 500° C., to magnetite and then oxidizing the magnetite by means of oxygen-containing gases at from 200° to 450° C. to give said modified acicular ferrimagnetic iron oxide.

3. A process for the preparation of a modified acicular ferrimagnetic iron oxide as claimed in claim 1, comprising depositing an organo-tin compound which is decomposable at from 350° to 500° C. on a synthetic lepidocrocite, or an alpha-iron (III) oxide obtained therefrom by dehydration, reducing the synthetic lepidocrocite or an alpha-iron (III) oxide obtained therefrom by dehydration containing said deposited organo-tin compound, at from 350° to 500° C., to magnetite and then oxidizing the magnetite by means of oxygen-containing gases at from 200° to 450° C. to give said modified acicular ferrimagnetic iron oxide.

* * * * *